United States Patent
Henrickson et al.

(10) Patent No.: US 11,852,483 B1
(45) Date of Patent: Dec. 26, 2023

(54) DITHER MOTOR APPARATUS WITH PICKOFF EMBEDDED DRIVES FOR RING LASER GYROSCOPE

(71) Applicant: Honeywell International Inc., Charlotte, NC (US)

(72) Inventors: Jens M Henrickson, Saint Paul, MN (US); Lori J Armon, Minneapolis, MN (US); Robert Alan Martinson, Ramsey, MN (US); Rory J. Balzar, North Branch, MN (US); Steven Edward Peter, Blaine, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/886,759

(22) Filed: Aug. 12, 2022

(51) Int. Cl.
*G01C 19/66* (2006.01)
*H02N 2/12* (2006.01)

(52) U.S. Cl.
CPC ............. *G01C 19/664* (2013.01); *H02N 2/12* (2013.01)

(58) Field of Classification Search
CPC ................................ G01C 19/664; H02N 2/12
See application file for complete search history.

(56) References Cited

U.S. PATENT DOCUMENTS

| | | |
|---|---|---|
| 4,085,825 A | 4/1978 | Scarborough |
| 4,406,965 A | 9/1983 | Ljung |
| 4,565,941 A | 1/1986 | Ridgway et al. |
| 4,856,901 A | 8/1989 | Ferriss et al. |
| 4,981,359 A | 1/1991 | Tazartes et al. |
| 4,988,908 A | 1/1991 | Langton |
| 5,173,745 A | 12/1992 | Hanse |
| 5,326,163 A | 7/1994 | Langton |
| 5,359,413 A * | 10/1994 | Chang ............. G01C 19/68 356/469 |
| 5,618,183 A | 4/1997 | Gilmore et al. |
| 5,950,995 A * | 9/1999 | Beckwith ............. G01C 19/70 310/48 |
| 6,041,652 A | 3/2000 | Stewart |
| 7,375,816 B2 | 5/2008 | Schober |
| 2021/0048296 A1* | 2/2021 | Fell ................. G01C 19/5684 |

* cited by examiner

*Primary Examiner* — Emily P Pham
(74) *Attorney, Agent, or Firm* — Fogg & Powers LLC (57) ABSTRACT

Drive-embedded dither pickoff embodiments for a dither motor of a ring laser gyroscope are disclosed. In one embodiment, an apparatus comprises a dither motor comprising an outer rim; a hub section; and a plurality of reeds that couple the hub section with the outer rim. A first pickoff embedded drive transducer is mounted on a first side of at least one reed. The first pickoff embedded drive transducer includes a first pickoff section, and a first drive section that is separated from the first pickoff section by a first insulative gap. A second pickoff embedded drive transducer is mounted on a second side of the at least one reed in a back-to-back relationship with the first pickoff embedded drive transducer. The second pickoff embedded drive transducer includes a second pickoff section, and a second drive section that is separated from the second pickoff section by a second insulative gap.

20 Claims, 6 Drawing Sheets

1-reed Pickoff Configuration

FIG. 4A

3-reed Pickoff Configuration
Rotation signals add

DITHER MOTOR APPARATUS WITH PICKOFF EMBEDDED DRIVES FOR RING LASER GYROSCOPE

BACKGROUND

A ring laser gyroscope (RLG) utilizes a dither pickoff signal to "strip" dither motion from a dithered output of the RLG. Typically, the dither pickoff signal is generated by a pair of piezo-ceramic elements fastened to a dither motor reed. This implementation has various disadvantages, including requiring a separate pair of piezo-ceramics for the pickoff, which increases dither motor cost and complexity. In addition, the pickoff reed is mechanically asymmetric, which can lead to non-ideal dither motion causing performance issues. Further, single-reed pickoff elements cannot distinguish between reed deflections from dither rotation and reed deflections from linear vibration. The latter has been demonstrated to produce significant coning/sculling correction errors in vibration environments when the RLG is implemented in an inertial measurement unit (IMU).

SUMMARY

Various embodiments of a drive-embedded symmetric dither pickoff for a dither motor of a ring laser gyroscope (RLG) are described herein. In one embodiment, an apparatus comprises a dither motor configured for at least one RLG, with the dither motor comprising an outer rim; a hub section within the outer rim; and a plurality of reeds that couple the hub section with the outer rim, the reeds each having a first side and an opposing second side. A first pickoff embedded drive piezoelectric transducer is mounted on the first side of at least one reed. The first pickoff embedded drive piezoelectric transducer includes a first pickoff section, and a first drive section that is separated from the first pickoff section by a first insulative gap. A second pickoff embedded drive piezoelectric transducer is mounted on the second side of the at least one reed in a back-to-back relationship with the first pickoff embedded drive piezoelectric transducer. The second pickoff embedded drive piezoelectric transducer includes a second pickoff section, and a second drive section that is separated from the second pickoff section by a second insulative gap. The first and second pickoff embedded drive piezoelectric transducers operatively work together to reduce second harmonic noise.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Various embodiments of a drive-embedded symmetric dither pickoff for a dither motor of a ring laser gyroscope are described herein.

Conventional dither motors for ring laser gyroscopes generally include an outer rim and a hub, with a set of reeds radially extending between the hub and the outer rim. The dither motor incorporates polarized piezoelectric (ceramic) transducers on the reeds that are configured in either of a drive mode or a pickoff mode. The piezoelectric transducers are generally attached in pairs on the first side and opposing second side of each reed, and configured such that the outward face of the piezoelectric transducers on the first side and second side of each reed are of opposite polarity. In operation, electrical leads are attached from the ring laser gyroscope electronics to the drive piezoelectric transducers to cause the reeds to oscillate or dither. The dithering motion is then passed onto laser blocks of the ring laser gyroscopes, thereby preventing a ring laser gyroscope lock-in condition. Separate electrical leads are also attached to the pickoff piezoelectric transducers, allowing the ring laser gyroscope electronics to measure the induced dither motion for use in dither processing algorithms.

In the present approach, a dither pickoff section is embedded in the dither drive piezoelectric transducers of one or more reeds on the dither motor. This approach eliminates the need for a separate set of pickoff piezo-ceramic elements. The dither pickoff section can be formed within the drive piezoelectric transducers by masking a conductive surface of the drive piezoelectric transducers to form a gap between the pickoff section and a drive section. In some embodiments, the gap is at least about 0.1 inch in order to prevent coupling between the pickoff section and the drive section. Multiple dither pickoff sections can be connected together through a flex-tape to produce a combined dither pickoff signal.

In one embodiment, a pair of pickoff embedded drive piezoelectric transducers are respectively provided on each side of one reed of a dither motor. For example, two pickoff sections can be provided, with one pickoff section per side of one reed of a dither motor with three reeds. The back-to-back relationship of the pickoff sections provides a reduction in second harmonic noise.

In another embodiment, pickoff embedded drive piezoelectric transducers are respectively coupled to one side of each reed of a dither motor. For example, three embedded pickoff sections can be provided, with one pickoff section per reed in a symmetric configuration around the hub of the dither motor. In this embodiment, the piezo polarity is apparent, so there is no need for marking the polarity. The symmetric design of this embodiment eliminates vibration sensitivity.

In a further embodiment, a set of first pickoff embedded drive piezoelectric transducers are symmetrically and respectively mounted on the first side of each reed, and a set of second pickoff embedded drive piezoelectric transducers are symmetrically and respectively mounted on the second side of each reed, in a back-to-back relationship with respective first pickoff embedded drive piezoelectric transducers. For example, six embedded pickoff sections can be provided, with two pickoff sections per reed (one on each side) in a symmetric configuration around the hub of the dither motor. The back-to-back relationship of the pickoff sections provides a reduction in second harmonic noise, and the symmetric design of the pickoff sections eliminates vibration sensitivity.

The present approach provide various benefits and advantages. These include reduced cost and complexity, as fewer piezoelectric transducer elements are needed, and easier assembly of the dither motor elements. In addition, improved drive symmetry is provided, since a pickoff reed has different mechanical properties than the other reeds without a pickoff element, causing asymmetric dither motion. Further, reduced vibration sensitivity can be achieved with the implementation of symmetric pickoff sections, which substantially eliminates pickoff vibration sensitivity and improves performance of the dither motor.

Further details related to the present embodiments are described as follows and with reference to the drawings.

Figure 1A:
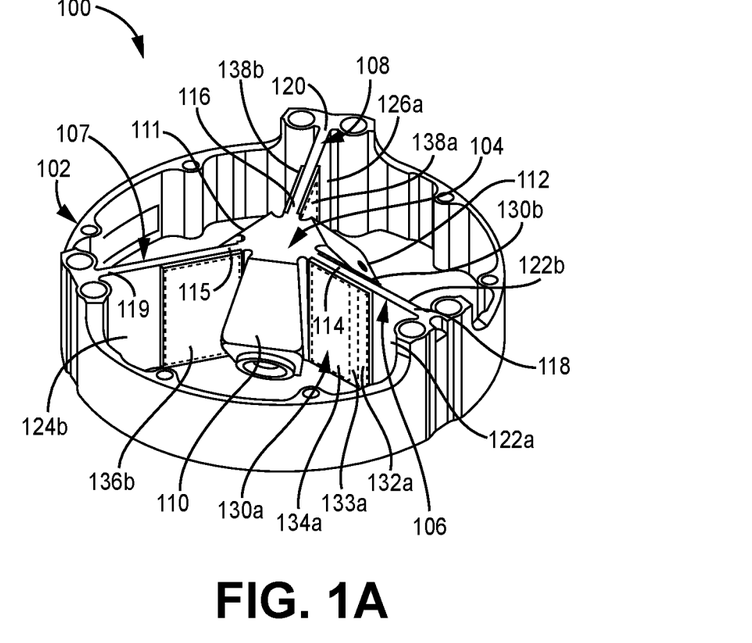
FIGS. 1A and 1B are perspective views of a dither motor for a set of ring laser gyroscope (RLG) devices, according to one embodiment.
Figure 1B:
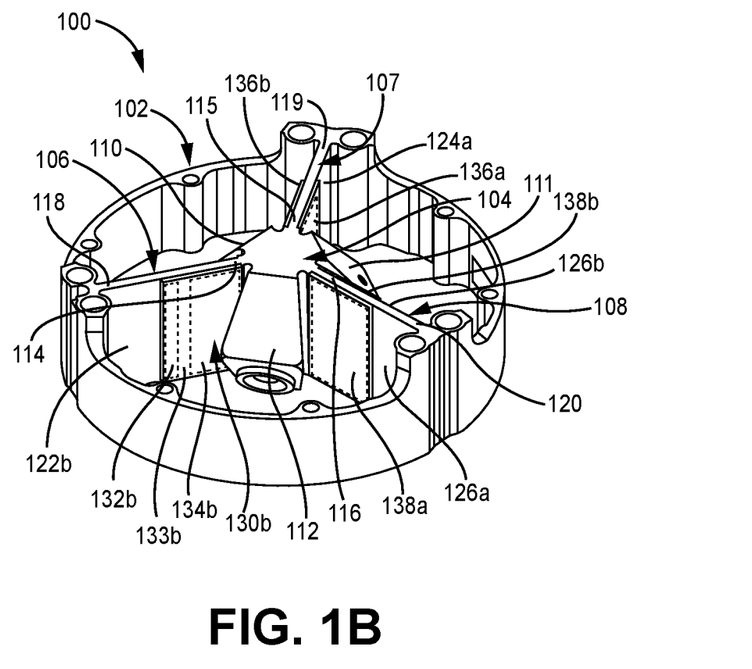

FIGS. 1A and 1B illustrate a dither motor 100 for a set of ring laser gyroscope (RLG) devices, according to one embodiment. The dither motor 100 includes an outer rim 102, and a hub section 104 within outer rim 102. While dither motor 100 is shown as having a generally circular shape, it will be understood by those skilled in the art that the dither motor can have other shapes. A plurality of radially extending reeds 106, 107, 108 are configured to couple hub section 104 to outer rim 102. A plurality of support sections 110, 111, 112 extend from hub section 104, with each of support sections 110-112 configured to engage a laser block of a respective RLG device (not shown) to produce a multi-RLG cluster. In an alternative embodiment, a single RLG can be mounted to outer rim 102 instead of hub section 104, to provide a single axis dither motor.

As shown in FIGS. 1A and 1B, reeds 106-108 may be substantially equally spaced from one another. Each of reeds 106, 107, 108 have a respective hub end 114, 115, 116 that is coupled to hub section 104. Each of reeds 106, 107, 108 also have a respective rim end 118, 119, 120 that is coupled to outer rim 102. The reed 106 has a first side 122a and an opposing second side 122b. The reed 107 has a first side 124a and an opposing second side 124b. The reed 108 has a first side 126a and an opposing second side 126b. FIG. 1B shows dither motor 100 rotated clockwise with respect to FIG. 1A.

A first pickoff embedded drive piezoelectric transducer 130a is mounted on first side 122a of reed 106. A second pickoff embedded drive piezoelectric transducer 130b is mounted on second side 122b of reed 106 in a back-to-back relationship with first pickoff embedded drive piezoelectric transducer 130a. As shown in FIG. 1A, first pickoff embedded drive piezoelectric transducer 130a includes a pickoff section 132a, and a drive section 134a that is separated from pickoff section 132a by an insulative gap 133a. As shown in FIG. 1B, second pickoff embedded drive piezoelectric transducer 130b correspondingly includes a pickoff section 132b, and a drive section 134b that is separated from pickoff section 132b by an insulative gap 133b.

In addition, a first drive piezoelectric transducer 136a is mounted on first side 124a of reed 107, and a second drive piezoelectric transducer 136b is mounted on second side 124b of reed 107. A first drive piezoelectric transducer 138a is mounted on first side 126a of reed 108, and a second drive piezoelectric transducer 138b is mounted on second side 126b of reed 108.

In dither motor 100, the back-to-back relationship of pickoff embedded drive piezoelectric transducers 130a, 130b allows them to operatively work together to reduce second harmonic noise.

Figure 2A:
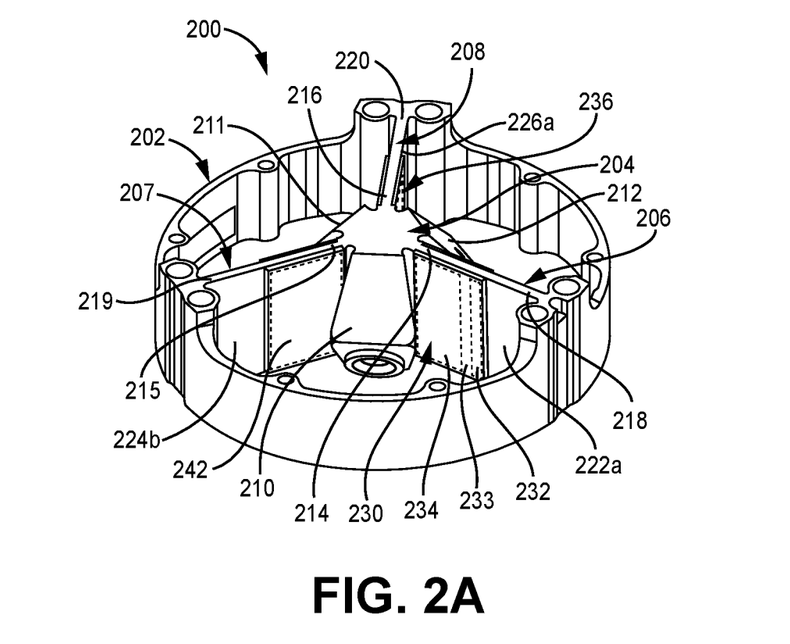
FIGS. 2A and 2B are perspective views of a dither motor for a set of RLG devices, according to another embodiment.
Figure 2B:
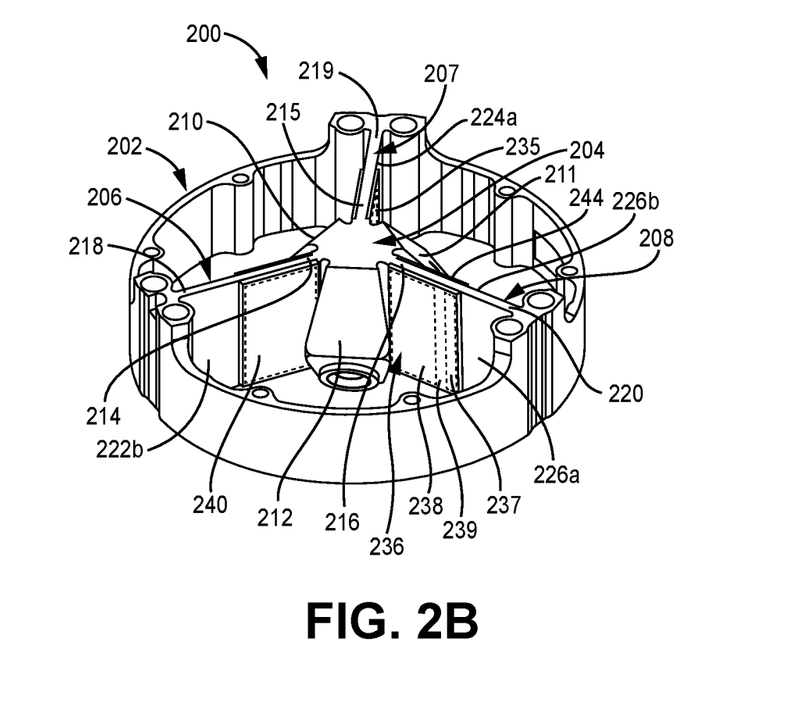

FIGS. 2A and 2B illustrate a dither motor 200 for a set of RLG devices, according to another embodiment. The dither motor 200 includes an outer rim 202 having a generally circular shape, and a hub section 204 within outer rim 202. A plurality of reeds 206, 207, 208 radially extend between hub section 204 and outer rim 202. A plurality of support sections 210, 211, 212 extend from hub section 204, with each of support sections 210-212 configured to engage a laser block of a respective RLG device (not shown) to produce a multi-RLG cluster. In an alternative embodiment, a single RLG can be mounted to outer rim 202 instead of hub section 204, to provide a single axis dither motor.

As shown in FIGS. 2A and 2B, reeds 206, 207, 208 may be substantially equally spaced from one another. Each of reeds 206, 207, 208 have a respective hub end 214, 215, 216 that is coupled to hub section 204. Each of reeds 206, 207, 208 also have respective a rim end 218, 219, 220 that is coupled to outer rim 202. The reed 206 has a first side 222a and an opposing second side 222b. The reed 207 has a first side 224a and an opposing second side 224b. The reed 208 has a first side 226a and an opposing second side 226b. FIG. 2B shows dither motor 200 rotated clockwise with respect to FIG. 2A.

A first pickoff embedded drive piezoelectric transducer 230 is mounted on first side 222a of reed 206. A second pickoff embedded drive piezoelectric transducer 235 is mounted on first side 224a of reed 207 (FIG. 2B), and a third pickoff embedded drive piezoelectric transducer 236 is mounted on first side 226a of reed 208. As shown in FIG. 2A, first pickoff embedded drive piezoelectric transducer 230 includes a pickoff section 232, and a drive section 234 that is separated from pickoff section 232 by an insulative gap 233. As shown in FIG. 2B, second pickoff embedded drive piezoelectric transducer 236 correspondingly includes a pickoff section 237, and a drive section 238 that is separated from pickoff section 237 by an insulative gap 239.

In addition, a drive piezoelectric transducer 240 is mounted on second side 222b of reed 206. A second drive piezoelectric transducer 242 is mounted on second side 224b of reed 207. A third drive piezoelectric transducer 244 is mounted on second first side 226b of reed 208.

As shown in FIGS. 2A and 2B, the pickoff embedded drive piezoelectric transducers 230, 235, 236 are symmetrically mounted on the first sides of respective reeds 206, 207, 208. The pickoff embedded drive piezoelectric transducers 230, 235, 236 operatively work together to substantially eliminate pickoff vibration sensitivity.

Figure 3A:
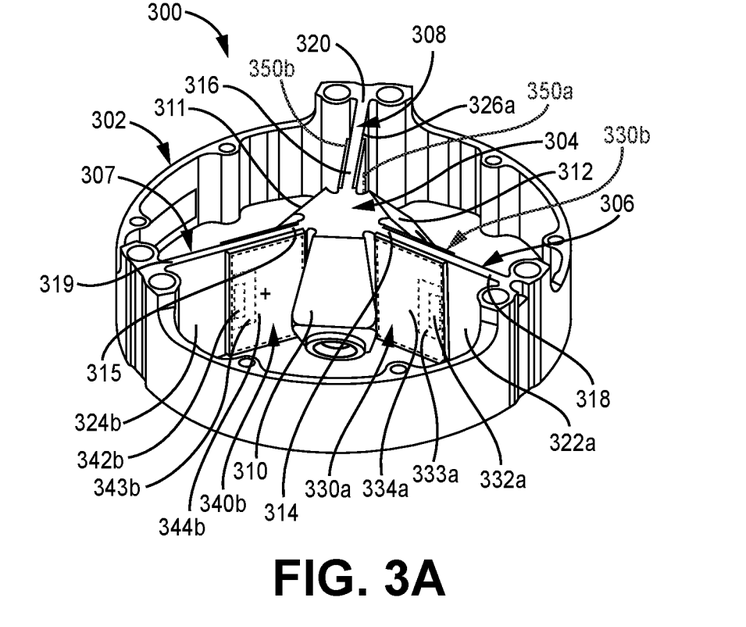
FIGS. 3A and 3B are perspective views of a dither motor for a set of RLG devices, according to a further embodiment.
Figure 3B:
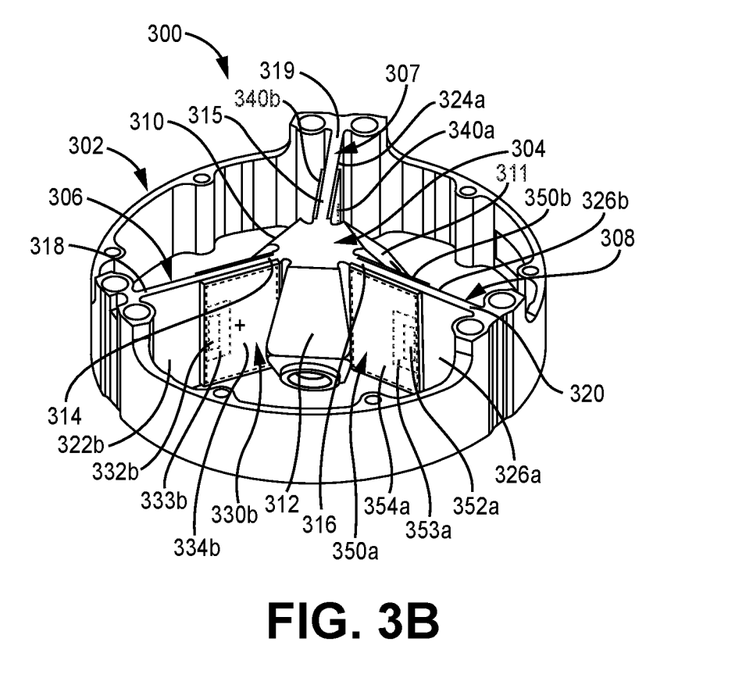

FIGS. 3A and 3B illustrate a dither motor 300 for a set of RLG devices, according to another embodiment. The dither motor 300 includes an outer rim 302 having a generally circular shape, and a hub section 304 within outer rim 302. A plurality of reeds 306, 307, 308 radially extend between hub section 304 and outer rim 302. A plurality of support sections 310, 311, 312 extend from hub section 304, with each of support sections 310-312 configured to engage a laser block of a respective RLG device (not shown) to produce a multi-RLG cluster. In an alternative embodiment, a single RLG can be mounted to outer rim 302 instead of hub section 304, to provide a single axis dither motor.

As shown in FIGS. 3A and 3B, reeds 306, 307, 308 may be substantially equally spaced from one another. Each of reeds 306, 307, 308 have a respective hub end 314, 315, 316 that is coupled to hub section 304. Each of reeds 306, 307, 308 also have respective a rim end 318, 319, 320 that is coupled to outer rim 302. The reed 306 has a first side 322a and an opposing second side 322b. The reed 307 has a first side 324a and an opposing second side 324b. The reed 308 has a first side 326a and an opposing second side 326b. FIG. 3B shows dither motor 300 rotated clockwise with respect to FIG. 3A.

A first pickoff embedded drive piezoelectric transducer 330a is mounted on first side 322a of reed 306, and a second pickoff embedded drive piezoelectric transducer 330b is mounted on second side 322b of reed 306. As shown in FIG. 3A, pickoff embedded drive piezoelectric transducer 330a includes a pickoff section 332a, and a drive section 334a that is separated from pickoff section 332a by an insulative gap 333a. As shown in FIG. 3B, pickoff embedded drive piezoelectric transducer 330b correspondingly includes a pickoff section 332b, and a drive section 334b that is separated from pickoff section 332b by an insulative gap 333b.

Likewise, a first pickoff embedded drive piezoelectric transducer 340a is mounted on first side 324a of reed 307, and a second pickoff embedded drive piezoelectric transducer 340b is mounted on second side 324b of reed 307. As shown in FIG. 3A, pickoff embedded drive piezoelectric transducer 340b includes a pickoff section 342b, and a drive section 344b that is separated from pickoff section 342b by an insulative gap 343b. Although not shown, pickoff embedded drive piezoelectric transducer 340a also has corresponding structures of a pickoff section, and a drive section separated from the pickoff section by an insulative gap.

In addition, a first pickoff embedded drive piezoelectric transducer 350a is mounted on first side 326a of reed 308, and a second pickoff embedded drive piezoelectric transducer 350b is mounted on second side 326b of reed 308. As shown in FIG. 3B, pickoff embedded drive piezoelectric transducer 350a includes a pickoff section 352a, and a drive section 354a that is separated from pickoff section 352a by an insulative gap 353a. Although not shown, pickoff embedded drive piezoelectric transducer 350b also has corresponding structures of a pickoff section, and a drive section separated from the pickoff section by an insulative gap.

The first and second pickoff embedded drive piezoelectric transducers of dither motor 300 operatively work together to reduce second harmonic noise, and to substantially eliminate pickoff vibration sensitivity.

Pickoff Vibration Sensitivity

It is known that the standard dither pickoff arrangement is susceptible to vibration. The standard dither pickoff arrangement has pickoff sections on one reed of the dither motor. This arrangement cannot distinguish between deflections caused by dither rotation and those caused by cross-axis vibration. The vibration-induced pickoff signal injects fake rotation noise through the dither stripper process. In addition to noise, this can interact with true gyroscope and acceleration motions to produce erroneous coning and sculling corrections.

The placing of pickoff elements symmetrically on all reeds of a dither motor can eliminate the pickoff vibration sensitivity. This is impractical when using separate pickoff piezo elements, but can be easily accommodated when using drive-embedded pickoff sections.

A comparison of a standard one-reed pickoff configuration with a symmetric three-reed pickoff configuration is described as follows with respect to FIGS. 4A-4C and FIGS. 5A-5C.

Figure 4A:
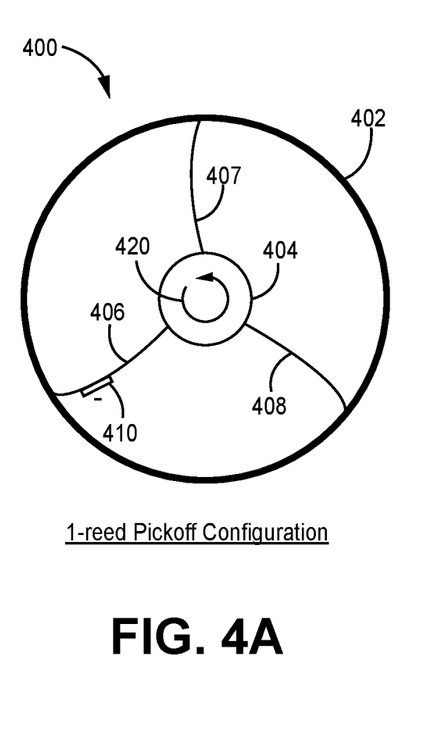
FIGS. 4A-4C are schematic illustrations of a one-reed pickoff configuration for a dither motor, according to a prior art embodiment.
Figure 4B:
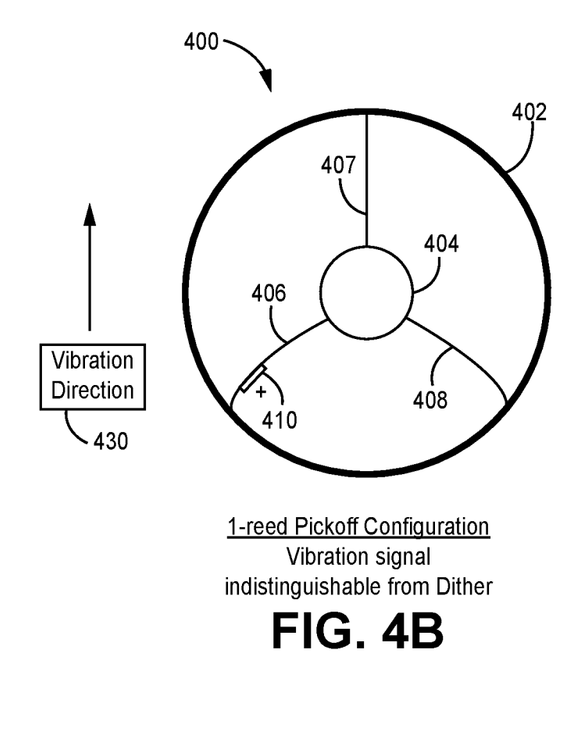
Figure 4C:
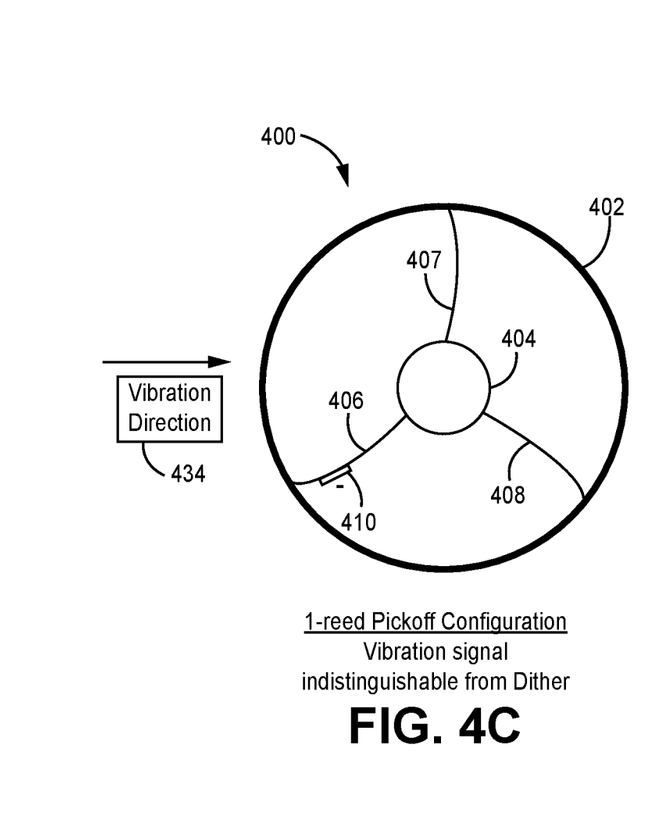

FIGS. 4A-4C schematically illustrate a one-reed pickoff configuration for a dither motor 400, according to a prior art embodiment. The dither motor 400 includes an outer rim 402 having a generally circular shape, and a hub section 404 within outer rim 402. A set of three reeds 406, 407, 408 radially extend between hub section 404 and outer rim 402. A piezoelectric pickoff element 410 is on mounted on one side of reed 406. The output signal polarity of piezoelectric pickoff element 410 at one instant due to cluster rotation (dither) or vibration is indicated as +/− in FIGS. 4A-4C. The corresponding reed deflection in dither motor 400 due to cluster rotation (dither) is indicated by arrow 420 in FIG. 4A.

Figure 5A:
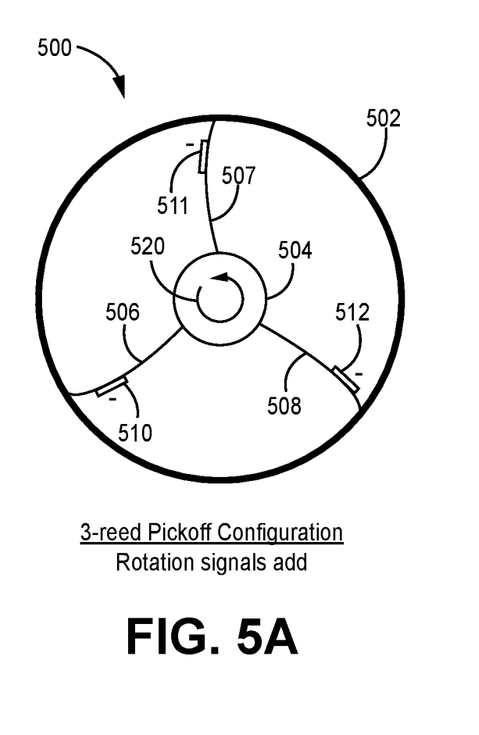
FIGS. 5A-5C are schematic illustrations of a symmetric three-reed pickoff configuration for a dither motor, according to an example embodiment.
Figure 5B:
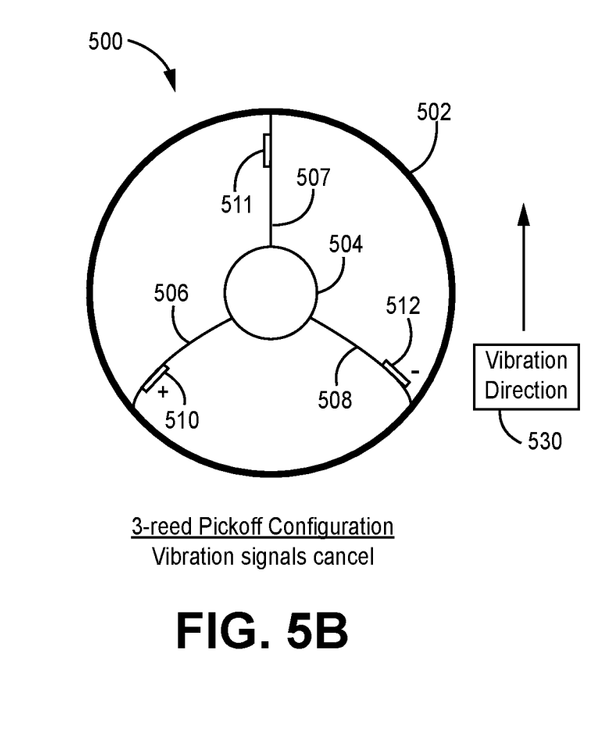
Figure 5C:
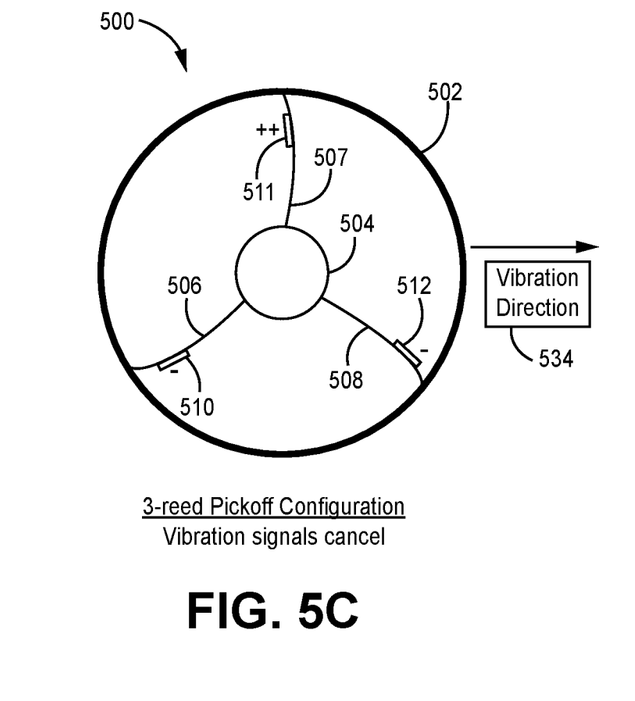

FIGS. 5A-5C schematically illustrate a symmetric three-reed pickoff configuration for a dither motor 500, according to an example embodiment of the present approach. The dither motor 500 includes an outer rim 502 having a generally circular shape, and a hub section 504 within outer rim 502. A set of three reeds 506, 507, 508 radially extend between hub section 504 and outer rim 502. A first piezoelectric pickoff element 510 is on mounted on one side of reed 506. A second piezoelectric pickoff element 511 is on mounted on one side of reed 507. A third piezoelectric pickoff element 512 is on mounted on one side of reed 508. The output signal polarity of each of piezoelectric pickoff elements 510, 511, 512 at one instant due to cluster rotation (dither) or vibration is indicated as +/− in FIGS. 5A-5C. The corresponding reed deflection in dither motor 500 due to cluster rotation (dither) is indicated by arrow 520 in FIG. 5A. The rotation signals add in the three-reed pickoff configuration of FIG. 5A.

Returning to FIG. 4B, the reed deflection in dither motor 400 due to vibration at one instant in one direction is shown, with the vibration direction (vertical) indicated at 430. In the one-reed pickoff configuration of FIG. 4B, the vibration signal is indistinguishable from the dither signal.

In FIG. 5B, the reed deflection in dither motor 500 due to vibration at one instant in one direction is also shown, with the vibration direction (vertical) indicated at 530. However, in the three-reed pickoff configuration of FIG. 5B, the vibration signals cancel each other, with the output signal polarity of piezoelectric pickoff element 510 being positive (+), and the output signal polarity of piezoelectric pickoff element 512 being negative (−).

Returning to FIG. 4C, the reed deflection in dither motor 400 due to vibration at one instant in another direction is shown, with the vibration direction (horizontal) indicated at 434. Again, in the one-reed pickoff configuration of FIG. 4C, the vibration signal is indistinguishable from the dither signal.

In FIG. 5C, the reed deflection in dither motor 500 due to vibration at one instant in another direction is also shown, with the vibration direction (horizontal) indicated at 534. Again, in the three-reed pickoff configuration of FIG. 5C, the vibration signals cancel each other, with the output signal polarity of piezoelectric pickoff element 510 being negative (−), the output signal polarity of piezoelectric pickoff element 512 being negative (−), and the output signal polarity of piezoelectric pickoff element 511 being double positive (++).

Example Embodiments

Example 1 includes an apparatus comprising: a dither motor configured for at least one ring laser gyroscope (RLG), the dither motor comprising: an outer rim; a hub section within the outer rim; a plurality of reeds that couple the hub section with the outer rim, the reeds each having a first side and an opposing second side; a first pickoff embedded drive piezoelectric transducer mounted on the first side of at least one reed, the first pickoff embedded drive piezoelectric transducer including a first pickoff section, and a first drive section that is separated from the first pickoff section by a first insulative gap; and a second pickoff embedded drive piezoelectric transducer mounted on the second side of the at least one reed in a back-to-back relationship with the first pickoff embedded drive piezoelectric transducer, the second pickoff embedded drive piezoelectric transducer including a second pickoff section, and a second drive section that is separated from the second pickoff section by a second insulative gap; wherein the first and second pickoff embedded drive piezoelectric transducers operatively work together to reduce second harmonic noise.

Example 2 includes the apparatus of Example 1, further comprising a plurality of support sections that extend from the hub section, wherein each of the support sections is configured to engage a laser block of a respective RLG device.

Example 3 includes the apparatus of any of Examples 1-2, further comprising a first drive piezoelectric transducer mounted on the first side of at least one other reed, and a second drive piezoelectric transducer mounted on the second side of at least one other reed.

Example 4 includes the apparatus of any of Examples 1-3, wherein each of the reeds extend radially between the hub section and the outer rim.

Example 5 includes the apparatus of any of Examples 1-4, wherein the plurality of reeds are substantially equally spaced from one another.

Example 6 includes the apparatus of any of Examples 1-5, wherein the plurality of reeds include three reeds.

Example 7 includes the apparatus of any of Examples 1-6, wherein the outer rim has a substantially circular shape.

Example 8 includes an apparatus comprising: a dither motor configured for at least one ring laser gyroscope (RLG), the dither motor comprising: an outer rim; a hub section within the outer rim; a plurality of reeds that couple the hub section with the outer rim, the reeds each having a first side and an opposing second side; and a set of pickoff embedded drive piezoelectric transducers symmetrically and respectively mounted on the first side of each reed, the pickoff embedded drive piezoelectric transducers each including a pickoff section, and a drive section that is separated from the pickoff section by an insulative gap; wherein the pickoff embedded drive piezoelectric transducers operatively work together to substantially eliminate pickoff vibration sensitivity.

Example 9 includes the apparatus of Example 8, further comprising a plurality of support sections that extend from the hub section, wherein each of the support sections is configured to engage a laser block of a respective RLG device.

Example 10 includes the apparatus of any of Examples 8-9, further comprising a set of drive piezoelectric transducers mounted on the second side of each reed.

Example 11 includes the apparatus of any of Examples 8-10, wherein each of the reeds extend radially between the hub section and the outer rim.

Example 12 includes the apparatus of any of Examples 8-11, wherein the plurality of reeds are substantially equally spaced from one another.

Example 13 includes the apparatus of any of Examples 8-12, wherein the plurality of reeds include three reeds.

Example 14 includes the apparatus of any of Examples 8-13, wherein the outer rim has a substantially circular shape.

Example 15 includes an apparatus comprising: a dither motor for at least one ring laser gyroscope (RLG), the dither motor comprising: an outer rim; a hub section within the outer rim; a plurality of reeds that couple the hub section with the outer rim, the reeds each having a first side and an opposing second side; a set of first pickoff embedded drive piezoelectric transducers symmetrically and respectively mounted on the first side of each reed, each of the first pickoff embedded drive piezoelectric transducers including a first pickoff section, and a first drive section that is separated from the first pickoff section by a first insulative gap; and a set of second pickoff embedded drive piezoelectric transducers symmetrically and respectively mounted on the second side of each reed, and in a back-to-back relationship with respective first pickoff embedded drive piezoelectric transducers, each of the second pickoff embedded drive piezoelectric transducers including a second pickoff section, and a second drive section that is separated from the second pickoff section by a second insulative gap; wherein the first and second pickoff embedded drive piezoelectric transducers operatively work together to reduce second harmonic noise, and to substantially eliminate pickoff vibration sensitivity.

Example 16 includes the apparatus of Example 15, further comprising a plurality of support sections that extend from the hub section, wherein each of the support sections is configured to engage a laser block of a RLG device.

Example 17 includes the apparatus of any of Examples 15-16, wherein each of the reeds extend radially between the hub section and the outer rim.

Example 18 includes the apparatus of any of Examples 15-17, wherein the plurality of reeds are substantially equally spaced from one another.

Example 19 includes the apparatus of any of Examples 15-18, wherein the plurality of reeds include three reeds.

Example 20 includes the apparatus of any of Examples 15-19, wherein the outer rim has a substantially circular shape.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. An apparatus comprising:
a dither motor configured for at least one ring laser gyroscope (RLG), the dither motor comprising:
an outer rim;
a hub section within the outer rim;
a plurality of reeds that couple the hub section with the outer rim, the reeds each having a first side and an opposing second side;
a first pickoff embedded drive piezoelectric transducer mounted on the first side of at least one reed, the first pickoff embedded drive piezoelectric transducer including a first pickoff section, and a first drive section that is separated from the first pickoff section by a first insulative gap; and a second pickoff embedded drive piezoelectric transducer mounted on the second side of the at least one reed in a back-to-back relationship with the first pickoff embedded drive piezoelectric transducer, the second pickoff embedded drive piezoelectric transducer including a second pickoff section, and a second drive section that is separated from the second pickoff section by a second insulative gap;

wherein the first and second pickoff embedded drive piezoelectric transducers operatively work together to reduce second harmonic noise.

2. The apparatus of claim 1, further comprising a plurality of support sections that extend from the hub section, wherein each of the support sections is configured to engage a laser block of a respective RLG device.

3. The apparatus of claim 1, further comprising a first drive piezoelectric transducer mounted on the first side of at least one other reed, and a second drive piezoelectric transducer mounted on the second side of at least one other reed.

4. The apparatus of claim 1, wherein each of the reeds extend radially between the hub section and the outer rim.

5. The apparatus of claim 1, wherein the plurality of reeds are substantially equally spaced from one another.

6. The apparatus of claim 1, wherein the plurality of reeds include three reeds.

7. The apparatus of claim 1, wherein the outer rim has a substantially circular shape.

8. An apparatus comprising:
a dither motor configured for at least one ring laser gyroscope (RLG), the dither motor comprising:
an outer rim;
a hub section within the outer rim;
a plurality of reeds that couple the hub section with the outer rim, the reeds each having a first side and an opposing second side; and
a set of pickoff embedded drive piezoelectric transducers symmetrically and respectively mounted on the first side of each reed, the pickoff embedded drive piezoelectric transducers each including a pickoff section, and a drive section that is separated from the pickoff section by an insulative gap;
wherein the pickoff embedded drive piezoelectric transducers operatively work together to substantially eliminate pickoff vibration sensitivity.

9. The apparatus of claim 8, further comprising a plurality of support sections that extend from the hub section, wherein each of the support sections is configured to engage a laser block of a respective RLG device.

10. The apparatus of claim 8, further comprising a set of drive piezoelectric transducers mounted on the second side of each reed.

11. The apparatus of claim 8, wherein each of the reeds extend radially between the hub section and the outer rim.

12. The apparatus of claim 8, wherein the plurality of reeds are substantially equally spaced from one another.

13. The apparatus of claim 8, wherein the plurality of reeds include three reeds.

14. The apparatus of claim 8, wherein the outer rim has a substantially circular shape.

15. An apparatus comprising:
a dither motor for at least one ring laser gyroscope (RLG), the dither motor comprising:
an outer rim;
a hub section within the outer rim;
a plurality of reeds that couple the hub section with the outer rim, the reeds each having a first side and an opposing second side;
a set of first pickoff embedded drive piezoelectric transducers symmetrically and respectively mounted on the first side of each reed, each of the first pickoff embedded drive piezoelectric transducers including a first pickoff section, and a first drive section that is separated from the first pickoff section by a first insulative gap; and
a set of second pickoff embedded drive piezoelectric transducers symmetrically and respectively mounted on the second side of each reed, and in a back-to-back relationship with respective first pickoff embedded drive piezoelectric transducers, each of the second pickoff embedded drive piezoelectric transducers including a second pickoff section, and a second drive section that is separated from the second pickoff section by a second insulative gap;
wherein the first and second pickoff embedded drive piezoelectric transducers operatively work together to reduce second harmonic noise, and to substantially eliminate pickoff vibration sensitivity.

16. The apparatus of claim 15, further comprising a plurality of support sections that extend from the hub section, wherein each of the support sections is configured to engage a laser block of a RLG device.

17. The apparatus of claim 15, wherein each of the reeds extend radially between the hub section and the outer rim.

18. The apparatus of claim 15, wherein the plurality of reeds are substantially equally spaced from one another.

19. The apparatus of claim 15, wherein the plurality of reeds include three reeds.

20. The apparatus of claim 15, wherein the outer rim has a substantially circular shape.

* * * * *